United States Patent

Biermann

[15] 3,675,892
[45] July 11, 1972

[54] METERING VALVE

[72] Inventor: William A. Biermann, Brookfield, Wis.

[73] Assignee: Controls Company of America, Melrose Park, Ill.

[22] Filed: Nov. 30, 1970

[21] Appl. No.: 93,670

[52] U.S. Cl. ........................................... 251/121
[51] Int. Cl. ............................................ F16k 47/04
[58] Field of Search ............... 251/120, 121, 205, 325, 357

[56] References Cited

UNITED STATES PATENTS

| | | | |
|---|---|---|---|
| 2,672,883 | 3/1954 | Dillman | 251/120 X |
| 3,221,768 | 12/1965 | Biermann | 251/121 X |
| 2,705,123 | 3/1955 | Hieger | 251/357 X |
| 2,929,401 | 3/1960 | Cowan | 251/357 X |
| 2,670,008 | 2/1954 | Kopp | 251/120 X |

FOREIGN PATENTS OR APPLICATIONS 219,203  8/1957  Australia ........................... 251/121

*Primary Examiner*—Henry T. Klinksiek
*Attorney*—John W. Michael, Gerrit D. Foster, Bayard H. Michael, Paul R. Puerner, Joseph A. Gemignani, Robert E. Clemency, Andrew O. Riteris, Glenn A. Buse and Spencer B. Michael

[57] ABSTRACT

The tubular metering stem is closely guided in the sleeve pressed into the bushing. The upper end of the guide sleeve serves as the valve seat. The stem is provided with a groove which receives the washer as it is coined in a fixture to flow the washer metal into the groove. The spacing between the washer and the corner of the groove below the washer is inadequate to receive the O-ring in a normal manner. Therefore, the corner bites into the O-ring forcing the O-ring against the washer and the bottom of the groove to insure against leakage between the ring and the stem or the washer. The spacing between the O-ring and the valve seat controls the low flow rate as the stem rises. Above low flow the rate is determined by the stem rise and the characteristics of the metering slot. Full shutoff is insured when the O-ring seats on the valve seat.

2 Claims, 2 Drawing Figures

PATENTED JUL 11 1972   3,675,892

Inventor
William A. Biermann
By Bayard H. Michael
Attorney

METERING VALVE

BACKGROUND OF INVENTION

In the past metering from the constant level chamber in oil controls has been by the provision of a metering slot — generally similar to the present slot arrangement — but no good answer was provided for full shutoff, accurate low flow control, and proper guiding of the stem.

SUMMARY OF INVENTION

The use of centerless ground tubing for the stem and guide permits accurate dimension control with superior fit and guidance. The manner of retaining the O-ring to insure against leakage between the ring and stem insures good low flow rate control. The manner in which the corner of the groove bites into the ring below the center of the ring uses the resiliency of the ring to force it into sealing engagement with the stem and the washer. The performance is improved and the cost of the assembly is quite favorable compared to prior designs.

DESCRIPTION OF PREFERRED EMBODIMENT

Figure 1:
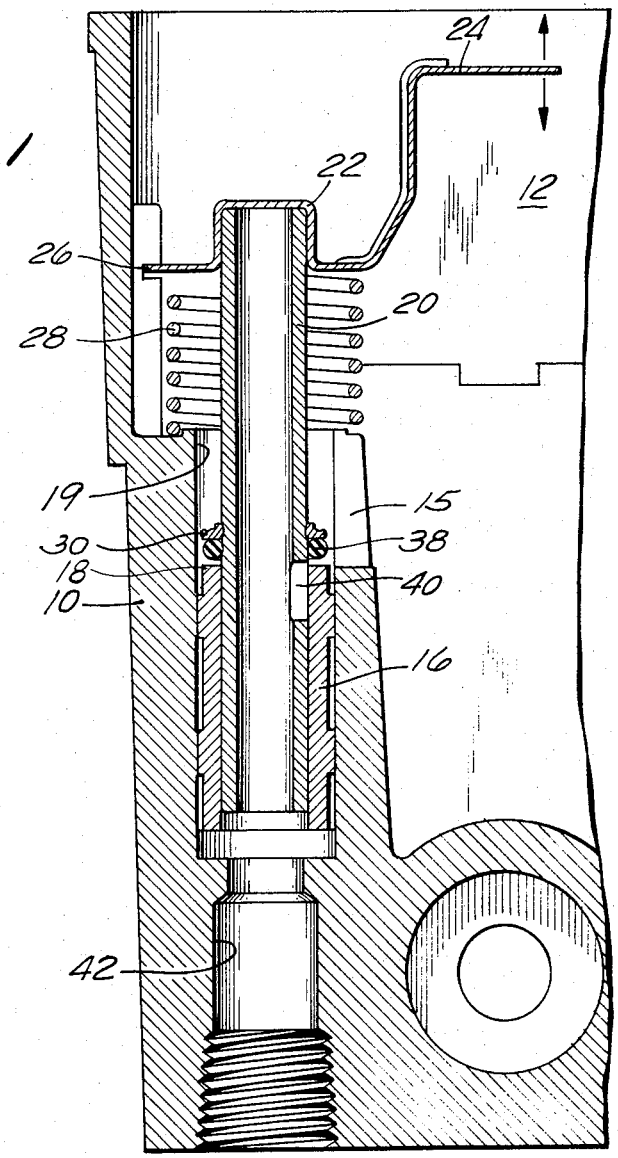
FIG. 1 is a fragmentary vertical section through a constant level chamber showing the metering valve assembly.

The oil control body 10 is provided with a constant level chamber 12 in which oil is maintained at a level indicated by the dashed line. Oil flows into cavity 14 in which the metering stem guide 16 is pressed through cutout 15. The upper end of the guide 16 serves as a valve seat 18. The guide is a tube having an accurately controlled inside dimension to closely receive the lower end of the metering stem 20. A spring seat 22 is secured to the upper end of the stem and includes a projecting arm 24 which is actuated (by suitable means) to move the stem vertically. The seat also includes a projecting finger portion 26 which runs in a guide slot cast into the body 10 to prevent rotation of the stem 20. Spring 28 biases the stem upwardly.

Figure 2:
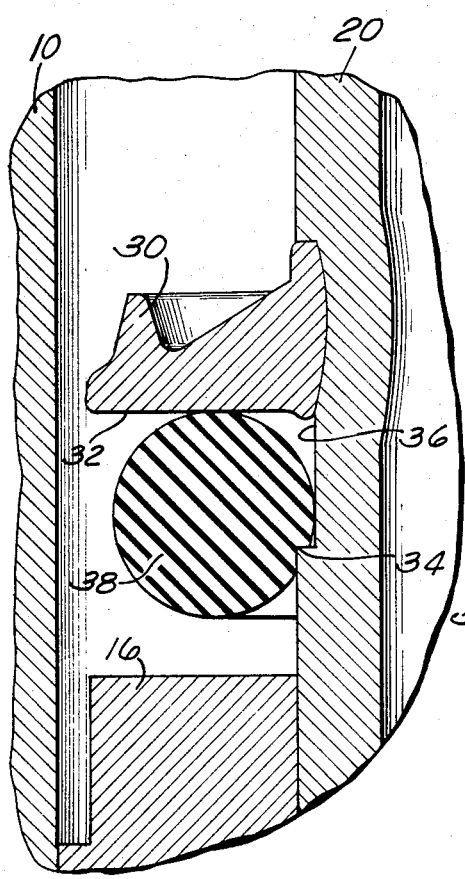
FIG. 2 is an enlarged section showing how the washer is coined to grip the stem and cooperate with the groove to retain the O-ring in sealing position.

Approximately midway along the length of the stem a groove is formed in the stem wall. Before the spring seat is mounted on the end of the stem, a flat washer 30 is positioned adjacent the groove with both the stem and the washer being held in suitable jigs insuring accurate location of the washer. At this time the washer 30 is coined, as shown in detailed FIG. 2, so that the bottom surface 32 is flat and the metal of the washer is made to flow inwardly due to configuration of the coining tool. The inwardly flowing metal bulges the wall of the stem 20 inwardly slightly and locks the washer to the sleeve. This makes a fluid tight seal between the washer and the stem. The space between the lower face 32 of the washer and the lower corner 34 of the groove 36 is inadequate to receive the O-ring 38 without the corner pinching into the O-ring. Since the corner is, in effect, offset from the center of the O-ring and since the O-ring is of smaller diameter than the base diameter of the groove 36, the net effect is to cause the O-ring to try to roll upwardly against the washer, which effects a good seal at this point. Also the O-ring grips or squeezes inwardly on the groove, and particularly at the corner, so as to effect a good seal here also. This insures against leakage between the O-ring and the stem or the washer. Therefore, the stem can be moved downwardly to seat the O-ring on valve seat 18 with the O-ring functioning as a resilient valve face. This will completely close off flow. If the stem is elevated very slightly, liquid can flow under the O-ring and then through the metering slot 40, the upper end of which just about coincides with the lower portion of the O-ring. The low flow rate is determined, however, by the spacing between the ring and seat 18 and, since the ring is held firmly in place, this gives a predictable and repeatable flow rate dependent upon elevation of the stem. As the stem is raised more, however, the metering function is taken over by the slot 40 and the extent to which the slot is exposed above the valve seat 18 combined with the width of the slot determines the rate of flow. Of course, the flow is from the outside of the stem to the inside and thence down through the outlet 42 in the bottom of the body.

The advantage of this construction over the prior art is utilizing an O-ring for effecting the complete closure or shutoff of oil flow and having the O-ring retained so accurately that it can be utilized for metering the pilot flow. Since the stem is a centerless ground tube, the exterior dimension can be closely controlled and, hence, can have a close fit inside the guide (the close fit generally runs 0.0005 to 0.0015 inches). Therefore, the stem is well guided throughout its range of movement.

I claim:

1. A liquid metering valve arrangement comprising
   a valve body in which a substantially constant level is maintained,
   a cavity in the body with an open upper end below the liquid level in the body and its lower end leading to an outlet,
   a guide sleeve pressed into the cavity,
   a stem closely fitting in the sleeve and having a groove formed therein,
   a washer fixed on the stem at the upper portion of the groove,
   an O-ring mounted on the stem at said groove,
   the groove width between the washer and the bottom corner of the groove being inadequate to receive the O-ring whereby the bottom corner engages and deforms the O-ring to effect a seal therebetween and to urge the O-ring against the washer to effect a further seal,
   said stem being movable vertically to seal the O-ring against the upper end of said guide sleeve and to move the O-ring from said upper end to allow flow therebetween,
   and a metering slot in the stem for metering flow into the hollow stem and then to said outlet.

2. Apparatus according to claim 1 in which the washer is coined while positioned at said groove to flow the metal of the washer into the groove and slightly deform the groove and effect a seal between the washer and groove.

* * * * *